April 9, 1968 J. C. SIMS, JR 3,377,583

VARIABLE DENSITY MAGNETIC BINARY RECORDING
AND REPRODUCING SYSTEM

Filed Oct. 8, 1964 5 Sheets-Sheet 1

INVENTOR
JOHN C. SIMS, JR.

BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.

BY
Kenway, Jenney & Hildreth
ATTORNEYS

INVENTOR
JOHN C. SIMS, JR.

BY
Kenway, Jenney & Hildreth
ATTORNEYS

INVENTOR
JOHN C. SIMS, JR.

BY
Kenway, Jenney & Hildreth
ATTORNEYS

United States Patent Office 3,377,583
Patented Apr. 9, 1968

3,377,583

VARIABLE DENSITY MAGNETIC BINARY RECORDING AND REPRODUCING SYSTEM

John C. Sims, Jr., Sudbury, Mass., assignor, by mesne assignments, to Mohawk Data Science Corporation, East Herkimer, N.Y., a corporation of New York Filed Oct. 8, 1964, Ser. No. 402,499
16 Claims. (Cl. 340—174.1)

My invention relates to information processing apparatus, and particularly to a novel method and apparatus for recording and reproducing information at a density which can be controlled.

Numerous self-clocking modulation schemes have been devised for recording and reproducing information on media such as magnetic recording discs, drums, tape and the like. Self-clocking systems are preferable to those which require a clock pulse train, since there is normally an indeterminate phase shift between the recording and reproducing of information. One type of modulation which is self-clocking in nature is disclosed in my copending U.S. application Ser. No. 341,969, filed on Feb. 3, 1964, for Phase Modulated Magnetic Recording and Reproducing System, now, U.S. Pat. No. 3,299,414, an improvement on which is disclosed in my copending U.S. application Ser. No. 393,242, filed Aug. 31, 1964, for Reproducing system for Phase Modulated Magnetically Recorded Data, now U.S. Pat. No. 3,323,115; both applications are assigned to the assignee of the present application. Basically, these systems involve recording a cycle at a first frequency for each occurrence of a given truth value of the set 0 and 1 in the data, and inverting the phase at the first frequency for one cycle for each of the other truth values in the data stream. In this mode of recording, one logical truth value is represented by a cycle at the fundamental frequency, and the opposite truth value is represented by a half cycle at one-half the first frequency. While a system employing this mode of recording and reproducing is highly reliable, its efficiency is approximately one half of that of a clocked system, such as a system using the well known "non-return-to-zero" modulation accompanied by a parallel clock pulse stream. It is an object of my invention to improve the efficiency of self-clocking information recording and reproducing systems.

The density with which information may be reliably recorded on a particular medium is governed in part by the efficiency of the recording scheme employed; or, to put it another way, for a given means of modulation, the reliability of the recorded data will be determined by the density of recording. Some kinds of data are more important than others; for example, statistical tables used over and over again in a programmed information processing operation are expensive to replace if destroyed, whereas transient data which is changed during a computation or from day to day may be replaced at less cost. For this reason, it would be desirable to be able to change the reliability of the recording and reproducing system in dependence upon the nature of the data being processed, if this can be done with a corresponding increase in recording density. It is a second object of my invention to make is possible to change the density of recording with a concomitant change in reliability so that transient data may be recorded at higher density, with somewhat lower reliability, than the density with which important basic data is recorded.

In the information recording and reproducing system of my invention, data is modulated as, and represented by, a series of pulse transitions, one for each of a selected truth value in the data, interspersed with a regular series of pulse transitions representing framing bits, one for each $n$ data bit transitions. The number $n$ of bits associated with each of the regularly spaced framing bit transitions may be any number from 1 to about 5. Higher values than 5 might be employed if desired, although the increase in the efficiency with each increase of $n$ above 1 becomes smaller and smaller, while the required bandwidth becomes larger and larger. Moreover, an initial synchronizing or framing sequence including a framing transition and $n$ data cells in which no transition takes place are required to initially synchronize the system, and the system would obviously become highly inefficient as $n$ grew very large, simply because the framing sequence would occupy too much of the data track.

Information recorded in the form just briefly described may be recovered in accordance with my invention by apparatus incorporating a retriggerable oscillator having a period equal to or somewhat longer than a data cell period, which functions in a manner to be described to reconstitute the original clock pulse train, together with a transition responsive device producing an output for each transition recovered from the recording surface. The outputs of the clock oscillator and the transition responsive device are gated together to produce a data output in which there will be an output pulse for each of the selected truth values in the original stream together with pulses representing the framing transitions. The latter are removed by apparatus which deframes the pulse stream, leaving only data pulses.

The apparatus of my invention will best be understood in the light of the accompanying drawings, together with the following detailed description, of a preferred embodiment thereof.

Figure 1:
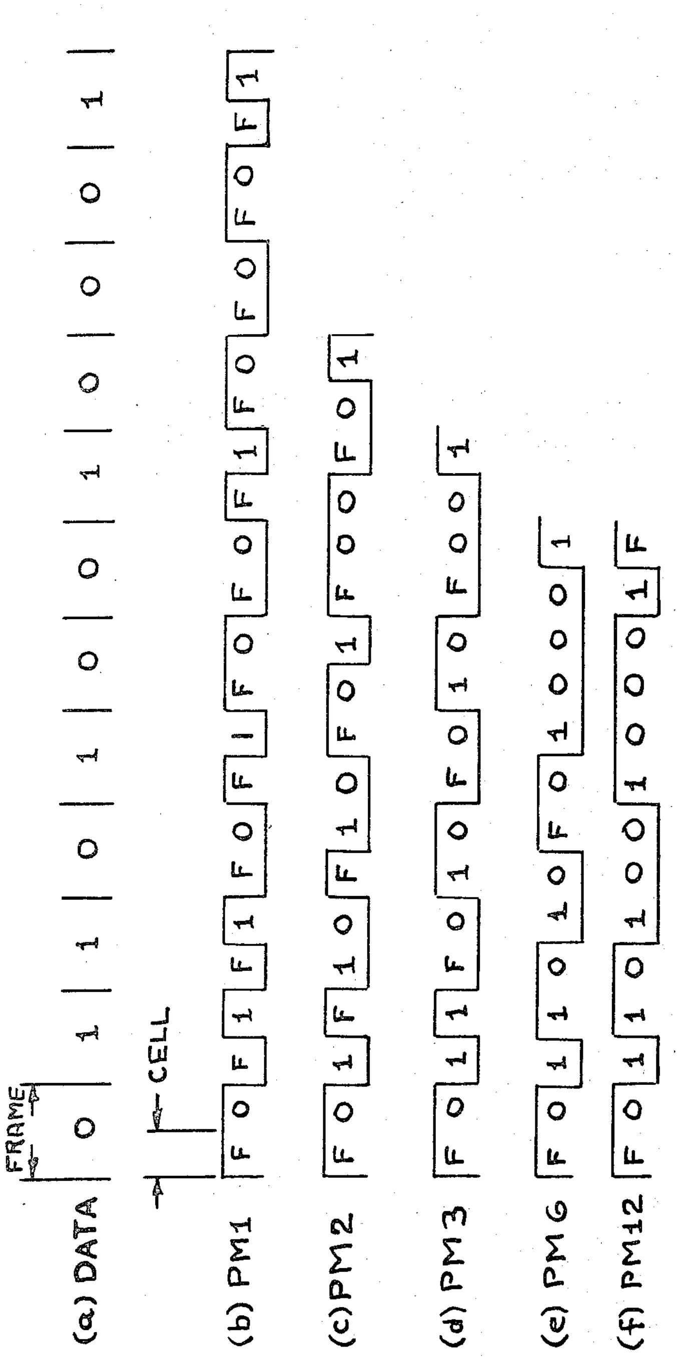
FIG. 1 is a series of graphs illustrating the mode of modulation characteristic of my invention compared with a self-clocking mode of modulation of conventional efficiency.

Referring now to FIG. 1(*a*), I have shown a series of binary bits 011010010001, each of which is to be recorded in a frame having a time duration related to the data bit rate of recording and corresponding to a length along a data track on a magnetic recording surface determined by the number of frames per inch which can be reliably recorded and reproduced. As will appear, the frame density of recording depends on the manner in which each frame is subdivided, as determined by the mode of modulation employed in recording the data.

FIG. 1(*b*) shows the data of FIG. 1(*a*) modulated in the "change-phase-on zero" mode described in my copending U.S. application Ser. No. 393,242, cited above. The graph may be interpreted either as a series of flux transitions from a first to an opposite state on a magnetic recording track, or as a series of voltage or current transitions between two levels in an electronic circuit. While the modulation may be considered as the recording of one cycle at a first frequency for each logic 1 in the data and the recording of a half cycle at one-half the first frequency for a logic 0, for present purposes it is more convenient to describe it as the result of introducing a transition (of flux or voltage) at the leading edge of each frame boundary, and introducing an opposite transition in the frame if, and only if, the bit to be recorded is logic 1. More specifically, each frame is divided into two equal cells, and the transition for a logic 1 occurs at the leading edge of the second cell in the frame. It will be seen from FIG. 1(*b*) that the result is a series of framing cells F alternating with a series of data bits corresponding to the data to be recorded. The framing bits F may be regarded as a series of logic 1's, so that modulation consists of inserting a logic 1 between each data bit and the next, and recording all logic 1's in the resulting train by a flux transition at the leading edge of the corresponding cell.

The framing bits serve to recover the clock pulse train, making the recording train self-clocking. If synchronization is lost, as may occur when a bad spot on the recording track is encountered, it may be regained at the next occurring logic zero in the data, recorded as F0. The probability of occurrence of a logic zero in the data ordinarily encountered is high, and usually is greater than one-half, so that the technique is highly reliable. However, it will be apparent that the recording efficiency of the modulation technique of FIG. 1(*b*) is only fifty percent, since one-half of the recording cells used are occupied by framing bits. So far as I am aware, other known prior modulation methods are less reliable, but still do not exceed fifty percent efficiency. I have discovered, however, that it is possible to increase the efficiency of recording, without losing the advantages of a self-locking method, by employing the modulating methods illustrated in FIGS. 1(*c*) through 1(*f*). These methods differ from that shown in FIG. 1(*b*) in that progressively more data bits are associated with each framing bit, and that all are more efficient than the method of FIG. 1(*b*) or other known self-clocking techniques. The number of data bits associated with each framing bit in the modulated signal may be denoted the "phase modulus" of the signal, abbreviated "PM." Regarding in this way, I have illustrated modulations of PM1, PM2, PM3, PM6 and PM12. It will be seen that the PM2 modulation shown in FIG. 1(*c*) is about 25 percent more efficient than the PM1 modulation. The required bandwidth is somewhat more, being 3 to 1 rather than 2 to 1. Also, as will appear, an F00 frame is required for reframing should synchronization be lost. Since the probability that 00 will occur in a random data stream is one-fourth, there is more chance for error; however, the reliability is still adequately high for most purposes.

It will be seen from FIGS. 1(*c*) through 1(*f*) that each of the framing bits F is marked by a transition at its leading cell boundary. Each data 1 bit is similarly marked. The modulation for the general case PMN, where N is the phase modulus, is then that a 1 is inserted in the data stream for each N data bits, and all 1's in the resulting stream are marked by transitions at the leading boundaries of their associated cells.

As shown by FIGS. 1(*c*) through 1(*f*), the greatest increase in efficiency is obtained in going from PM1 to PM2, and progressively less advantage is obtained as the phase modulus is increased. At the same time, the required bandwidth increases rapidly. Thus, PM3 modulation requires a bandwidth ratio of 4 to 1, whereas PM6 requires a bandwidth of 7 to 1 without a corresponding increase in efficiency. In practice, there would be little reason to go beyond PM5. Within the range PM1 to PM5, however, a choice may be made between efficiency and reliability so that an optimum utilization of recording space may be achieved for any desired purpose, by means of the system illustrated in FIG. 2.

Figure 2:
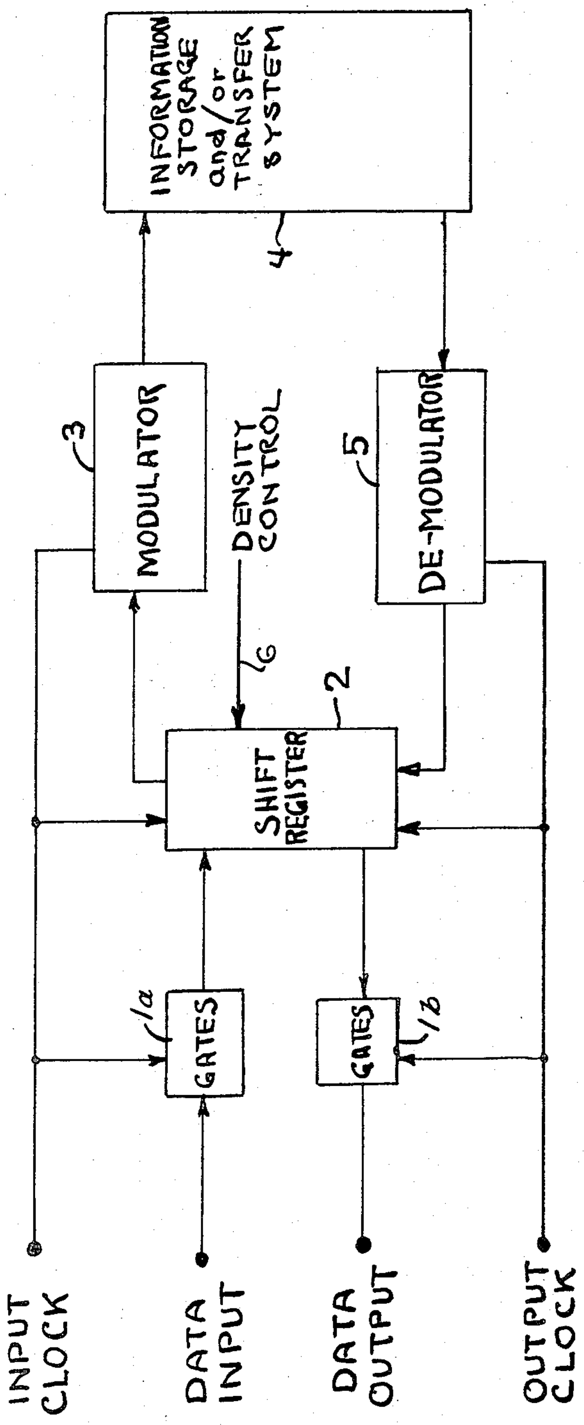
FIG. 2 is a functional block diagram of a variable density information recording and reproducing system in accordance with my invention.

Referring now to FIG. 2, I have shown a system for recording and recovering data in which the recording density may be controlled at will. As indicated, data to be recorded is supplied to a shift register 2 in the system through suitable conventional gates 1(*a*), from any conventional data source capable of providing data on command from an input clock pulse stream. Reproduced data is supplied to any suitable conventional data sink from the shift register 2 through conventional output gates 1(*b*) together with an output pulse stream.

Under the control of the input clock, data to be recorded is transferred from the shift register 2 to a modulator 3, in which the framing bits required by the phase modulus in use are inserted and a signal is derived having a flux transition for each logic 1 in the resulting data stream therefor. The output of the modulator is supplied to a suitable information storage system 4, which may be a conventional magnetic recording disk or the like, having accessible data tracks interspersed with inter-record gaps on which synchronizing frames may be recorded.

Information reproduced from the information storage system 4 is supplied, in the form of a voltage transition for each logic 1 in the recorded data stream, to a demodulator 5. In the demodulator, the original clock stream is reconstituted, and a pulse is produced for each logic 1 in the recovered stream data. The data is deframed, by discarding the framing logic 1's, and sent to the shift register 2.

A density control, schematically indicated at 6, is provided, functioning to set the modulator, demodulator and shift register to act on any selected phase modulus. The structure and operation of this control will best be understood in the light of the following detailed description. In the description, for simplicity, separate shift registers have been shown for input and output; it will be understood, however, that much of the structure of these registers could be shared by suitable conventional gating techniques, as it would not usually be required that both input and output functions be performed at the same time.

Figure 3:
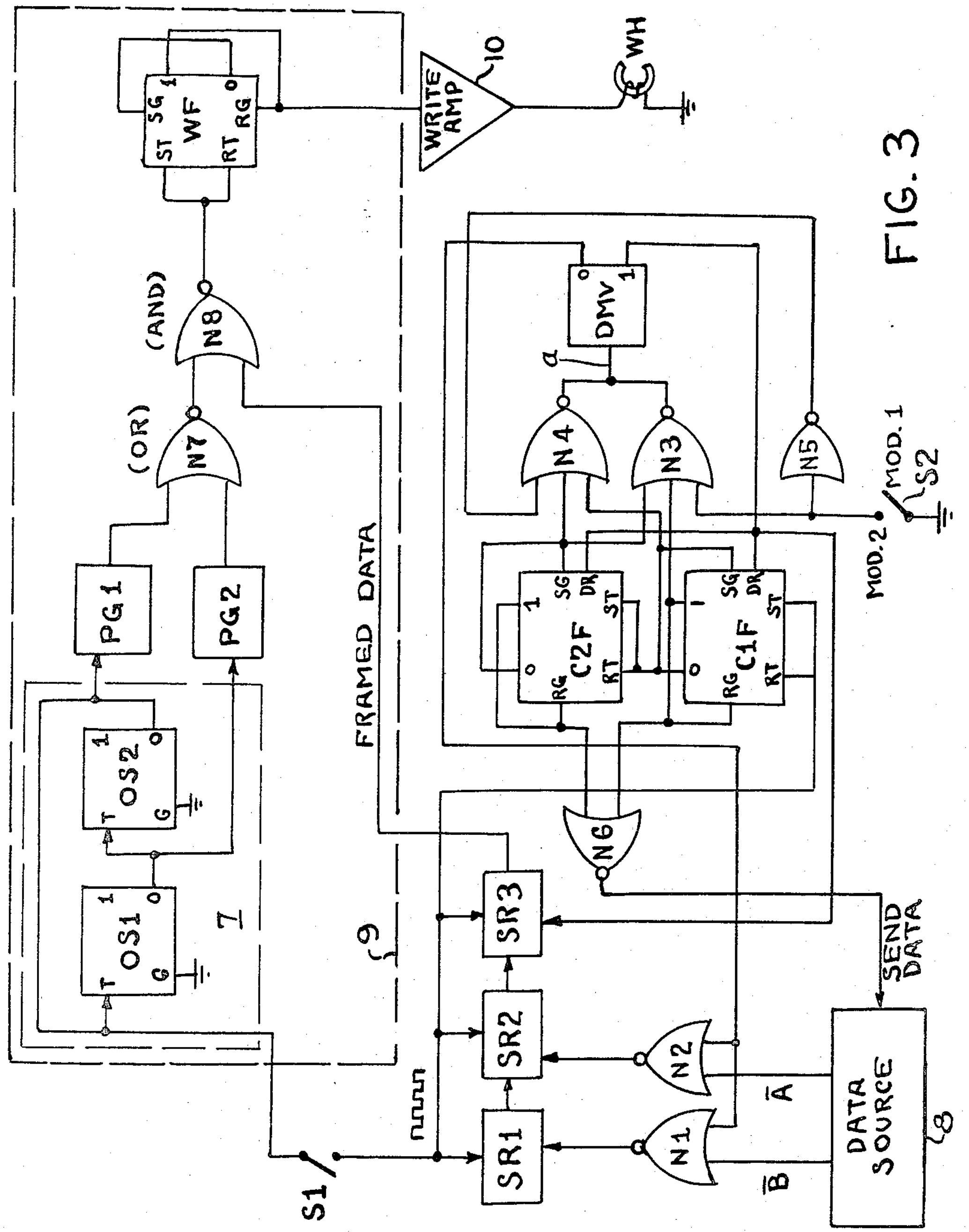
FIG. 3 is a schematic wiring diagram of modulating and recording apparatus forming a portion of the system of FIG. 2.

Referring now to FIG. 3, I have shown the recording portion of the system of FIG. 2 in more detail. The basic clock stream is provided by a conventional clock oscillator 7, assumed to be provided with conventional shaping circuits for producing a train of squared clock pulses. The clock may be enabled to start the recording process by conventional electronic switching means symbolized by a switch S1.

The input clock functions to step a conventional 3-stage shift register comprising three flip-flops SR1, SR2 and SR3, interconnected in a conventional manner such that each clock pulse shifts the contents of the register to the right in FIG. 3, leaving a logic zero in each register into which a logic 1 has not been shifted. Provision is also made for directly setting each of the stages SR1, SR2 and SR3.

The stages SR1, SR2 and SR3 may be of any conventional construction, but for example, may be of the type shown in FIG. 10 of my copending U.S. application Ser. No. 358,853, filed Apr. 10, 1964, for Variable Word Length Internally Programmed Information Processing System and assigned to the assignee of this application.

Provision is made for setting the stages SR1 and SR2 to correspond to two data bits A and B from a conventional data source 8. The source must be capable of providing data in the form of two bits in parallel for each input command on the line labelled "Send Data." The bit A is the first of each pair and the bit B is the second. As indicated, the bits A and B are provided in the form of their complements $\overline{A}$ and $\overline{B}$, where ($\overline{A}$ true) is represented by a ground level potential, and ($\overline{A}$ false) is represented by a negative potential or open circuit. Here, as elsewhere in the system to be described, true or logic 1 levels may be assumed to be represented by ground potential, and logic 0 or false levels by open circuits or negative potentials, following the conventions detailed in my copending applications cited above.

As shown in FIG. 3, the $\overline{A}$ and $\overline{B}$ data bits are supplied from the data source 8 through two conventional NOR gates N1 and N2. These gates, as well as other similarly labelled gates to be described, may be of the type shown in FIG. 9 of my above-cited copending application Ser. No. 258,853. These gates function to produce an output ground level, drawing current, when and only when an open circuit or negative potential is applied to each input terminal, and to exhibit an open circuit output when ground is applied to any input terminal. They may thus be variously used as AND, OR, NOR, or inhibiting circuits depending on the nature of the input associated with a given input truth value.

The gates N1 and N2 are enabled by a negative pulse produced by the 0 output terminal of a conventional delayed clock multivibrator DMV, of the type shown in FIG. 8 of my above-cited application Ser. No. 358,853, or any other suitable conventional delayed one-shot multivibrator. The multivibrator DMV produces a pulse going from ground to a negative level at its 0 output, and a pulse going from a negative level to ground at its 1 output, in response to a positive-going pulse applied to its input terminal *a*.

The loading of the shift register comprising the stages SR1, SR2 and SR3 is controlled by an adjustable modulus counter including two flip-flops C1F and C2F. These flip-flops may be of the same construction as the shift register stages such as SR1. They are provided with set and reset trigger input terminals ST and RT, set and reset gate input terminals SG and RG, direct reset terminals DR, and logic 1 and logic zero output terminals 1 and 0, respectively. The terminals are interconnected in a conventional manner to form a two stage binary counter, with additional connections controlled by NOR gates N3, N4 and N5 to provide a modulo two counter or a modulo three counter under the control of density control means here shown as a switch S2. In the position of the switch shown, the input terminals of the gates N5 and N3 are open-circuited, so that ground is applied to one input terminal of the gate N4 by gate N5, and the gate N3 is enabled to produce a ground level output when C1F is in its 0 state and C2F is in its 1 state, triggering the multivibrator DMV on count 10 of the counter. This position of the switch is used to modulate in PM1, with only one data bit A associated with each framing bit. For PM2 modulation, the switch is closed to disable the gate N3 and enable the gate N4 to trigger DMV on Count 11. When DMV is triggered, it causes the counter to be reset shortly afterward and within the same clock pulse from the terminal 1 of DMV. At the same time, with the counter now in its zero state, the gate N6 produces an output ground level to request data from the data source 8, and the gates N1 and N2 are enabled by the 0 output terminal of DMV. Simultaneously, a framing 1 is set into the stage SR3 by the 1 terminal of DMV. The next succeeding shift pulses will shift 1, A, in that order, out of the register to the input of a gate N8, for PM1 recording, or 1, A, B for PM2 recording, depending on the position of the switch S2. Initially, 0's will be shifted out of the register, until the first output pulse from DMV. The data source is required to send at least the first pair of bits A and B as zeroes, to synchronize the system, and typically will send several zeroes to occupy the interrecord gap and ensure synchronization. The start of data must be sent in the form of at least one sentinel 1 in the last pair of bits A and B preceding the data. Shifting of data is continuous in either recording modulus, as the shift register is automatically reloaded at the end of each shift cycle and before the beginning of the next shift cycle.

In the following description, for purposes of illustration, it will be assumed that each cell is of 1 microsecond duration. A modulating clock is provided to produce trigger pulses sampling the data at each leading cell boundary, consisting of a pair of one-shot multivibrators OS1 and OS2 interconnected to produce alternate output transitions in a positive-going sense such that OS2 will produce such a transition at the leading edge of each clock pulse, and OS1 will produce one at the trailing edge. These transitions alternately actuate conventional pulse generating circuits PG1 and PG2, which may be differentiators or the like, to produce positive pulses actuating a gate N7 to produce an open-circuit pulse once each 1 microsecond cell boundary of the clock. Thus, the gate N7 is used as an OR gate. The multivibrator OS1 and OS2 may be of any conventional type, such as the type shown in FIG. 11 of my above-cited copending application Ser. No. 358,853.

The gate N8 is enabled by the gate N7 to produce an output ground level trigger to change the state of a center-tripped flip-flop WF once for each logic one pulse shifted out of the shift register in the form of a negative-going pulse. The flip-flop WF may be of the same construction as the flip-flops C1F and C2F of the counter. As shown, the output of the flip-flop WF is applied directly to a conventional write amplifier 10, which serves to provide flux transitions in a conventional write head WH, assumed to be positioned adjacent a selected recording track on a magnetic recording disk movably mounted with respect to the head, and not shown.

Figure 5:
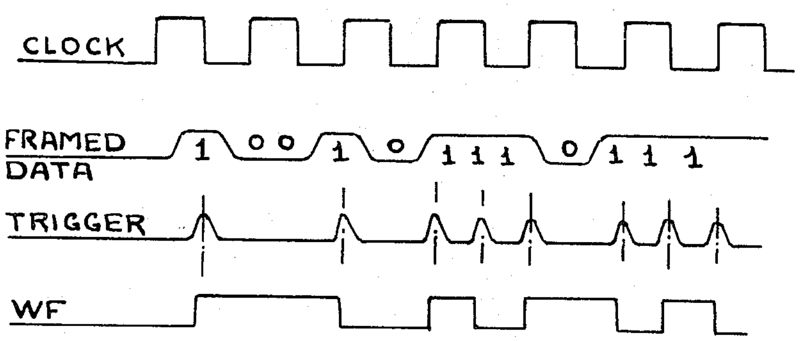
FIG. 5 is a timing chart illustrating the mode of operation of certain elements of the apparatus of FIG. 3.

Operation of the essential elements of the modulator of FIG. 3 is illustrated in FIG. 5, in connection with a typical data stream. In general, once the shift clock is enabled, data is continuously shifted out of the data source, into the shift register in parallel with the framing bit, and out of the shift register in series to the flip-flop triggering circuit. Whether one or two data bits is associated wtih each framing bit is determined by the position of the switch S2; obviously, the operation of this switch must be correlated with the operation of the data source so that the proper number of data bits will be produced in response to each "send data" command. The extension of the system to operation at higher phase moduli will be apparent to those skilled in the art from the two modulus system just described.

Figure 4:
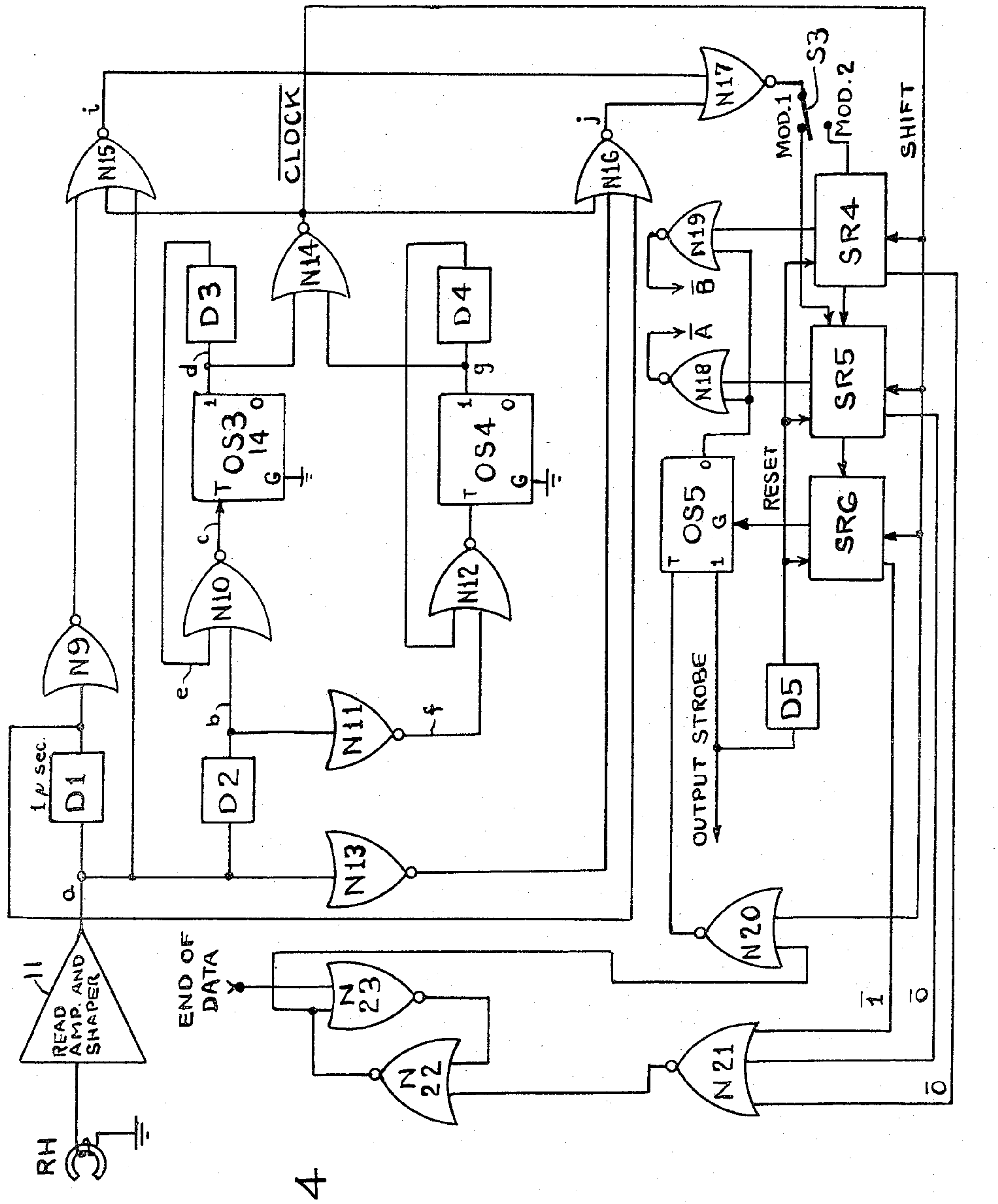
FIG. 4 is a schematic wiring diagram of data reproducing and correlating apparatus forming a portion of the system of FIG. 2.

Referring now to FIG. 4, the details of the data reproducing, correlating, reclocking and deframing portion of the system are shown. Similarly labelled components may be of the same construction as those shown in FIG. 3.

The apparatus of FIG. 4 is supplied with data recorded as described in connection with FIG. 3 by a conventional read head RH positioned adjacent a selected relatively moving recording track on a magnetic recording disk or the like, not shown. Flux transitions sensed by the head RH are suitably amplified and shaped by a conventional read amplifier and shaper 11. From these transitions, it is necessary both to reconstitute the clock and to produce a logic 1 pulse for each transition, as well as to discard the framing logic 1's.

The clock may be reconstituted by a suitable retriggerable oscillator having a period approximately equal to and not less than the cell period, here one microsecond. As here shown, a symmetrical oscillator is employed whose period may be exactly equal to the cell period. Two circuit sections are used, since a transition in the data may be in either of two opposite senses. Each section is arranged to produce clock pulses following a transition in a given sense, until the next transition in the opposite sense, following which it is shut off until the next transition in the given sense. One section comprises a NOR gate N10, a one-shot multivibrator OS3, and a conventional delay line D3 of the non-inverting type and of 0.6 microsecond delay in the example given. When the gate N10 is enabled by an open level at point *b*, and after the time, if any, required to bring the one-shot OS3 back to a negative potential at point *d* and for the point *e* to go to negative or open potential, the gate N10 will produce an output ground level triggering the one-shot OS3. In the example given, OS3 produces a pulse 0.4 microsecond in duration, the pulse being ground level at point *d*. This pulse is applied to a gate N14, serving as an OR gate to produce an open level "clock" ($\overline{clock}$ when at ground) for 0.4 microsecond, followed by 0.6 microsecond until the pulse emerges from the delay line D3 and retriggers the one-shot OS3.

A second section comprising the gate N12, the one-shot OS4, and the delay line D4, connected as an identical with the elements N10, D3 and OS3, is provided to produce clocking pulses to the gate N14 when the first section is cut off.

Selection of the two oscillating sections just described depends on the polarity of the input signal following a transition. As shown, this input signal at point *a* is applied through a conventional delay line D2, like the delay line D3 but of 0.3 microsecond duration, directly to the input of the gate N10, and through a gate N11 serving as an inverter to the input of the corresponding gate N12 in the second section. Thus, if the signal at point *a* is negative, the gate N10 will be enabled and the first section will function to produce clock pulses, whereas if the signal at *a* is positive, the gate N12 will be enabled and the second section will function. If desired, the automatic clock rate may be slightly slower than the cell rate, to provide positive retriggering at each transition in the data stream, but this feature is not necessary in the symmetrical system shown at the recommended values of phase modulus.

Logic 1's in the reproduced data stream are detected by the NOR gates N15, N16 and N17. The gate N15 responds to negative-going transitions to produce an output pulse at the first clock time occurring after the transition. Spurious output pulses at later clock times are inhibited by a delay line D1, like the delay line D3 but of 1 microsecond duration, and a gate N9 serving as an inverter. After the first cell period following a transition in which the gate N15 is enabled, it is disabled by the gate N9 and held disabled until the next negative-going transition. The gate N16 is then enabled by a gate N13, serving as an inverter, to produce an output ground level at point *j* in the first clock time. Spurious pulses at later clock times are inhibited by the output of the delay line D1, appearing after 1 microsecond.

The gate N17 serves as an OR gate to produce an open level logic 1 pulse for each ground level output pulse of each of the gates N15 and N16. These open level pulses are shifted into a shift register, of the type described in connection with FIG. 3, by the clock pulses produced by the gate N14. The phase modulus is selected by switching means shown as a switch S3. For PM2, three shift register stages SR4, SR5 and SR6 are employed, which may be the same as the stages SR1, SR2 and SR3 described above. When the first synchronizing frame 100 has been shifted into the registers SR4, SR5 and SR6, for PM2, or the synchronizing frame 10 has been shifted into the registers SR5 and SR6 for PM1, a gate N21 responds to set a flip-flop comprising two NOR gates N22 and N23 connected in conventional front-to-back relation. This flip-flop will remain set until reset by an end-of-data signal, included in the recorded data in a conventional manner and gated out by known means to provide the necessary signal.

When the flip-flop comprising the gates N22 and N23 is set, a gate N20 is enabled to produce a ground level triggering pulse at each clock pulse. After each frame of data is loaded, with a framing logic 1 stored in the register stage SR6, a gate is applied to a one-shot OS5 to permit the next pulse from the gate N20 to trigger the one-shot OS5. The output at the 0 terminal of the one-shot OS5 enables the gates N18 and N19 to send out the data bits stored in the register stages SR5 and SR4 in parallel. At the same time, one output strobe pulse is produced by the terminal 1 of the one-shot OS5. A delayed time later, and before the next shift pulse, the register stages SR4, SR5 and SR6 are reset through a delay line D5. It will be apparent that data will continue to be sent out, two bits in parallel with an accompanying strobe, until "end of data" is transmitted. Note that the framing bits are automatically discarded.

Figure 6:
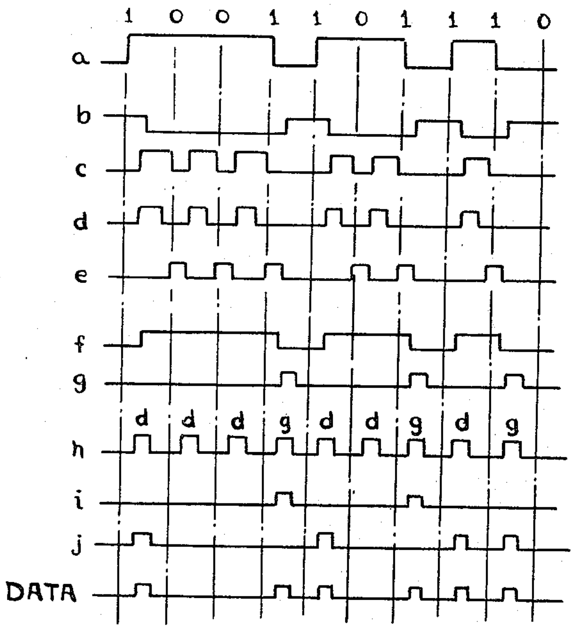
FIG. 6 is a timing chart illustrating the mode of operation of certain elements of the apparatus of FIG. 4.

Operation of the apparatus of FIG. 4 is illustrated, for a typical series of data bits modulated in PM2, in FIG. 6. It is believed that the operation under various conditions will be apparent from the foregoing description in the light of FIG. 6.

While I have described my invention with reference to the details of a particular embodiment, many changes and variations will be apparent to those skilled in the art upon reading my description, and such can obviously be made without departing from the scope of my invention.

Having thus described my invention, what I claim is:

1. In combination with a sensitized surface, apparatus for recording on said surface a train of data signals, each of which occupies a single cell and manifests one or the other of two distinct values, which comprises, means for interpolating in said train and immediately preceding each group of *n* consecutive data signals, *n* being an integer greater than one, a framing signal having a preselected one of said two values, thereby to develop a modified train, and means for converting all signals of said modified train that are of said preselected value into a transition between two distinct conditions of said surface, whereby framing signals are distinguishable from data signals by virtue of their regularity and data signals of one value are distinguishable from data signals of the other value by virtue of the spacing on said surface between consecutive transitions.

2. Apparatus for recovering a train of two-valued data signals from a sensitized surface on which they have been recorded along with framing signals, each of said data signals occupying a cell, a framing signal being interposed on said record between each group of *n* consecutive data signals and the next, all framing signals and all data signals of one of said two values being recorded as transitions between two distinct conditions of said surface, the record of each data signal of the other of said two values being characterized by lack of a transition in its cell, which comprises a shift register having $n+1$ tandem-connected stages, means for consecutively inserting transition-representative pulses into the tail stage of said shift register at the irregular instants at which they occur, means for regularly advancing the contents of said shift register at the rate at which the successive cells of said record pass by a fixed point, means responsive to the appearance of a transition-representative pulse in the head stage of said register for transferring to their respective receivers the contents of the other stages of said shift register.

3. Apparatus as defined in claim 2 wherein said contents-passing means comprises *n* gates, each having an input terminal and an enabling terminal, the several input terminals being connected to the several shift register stages, other than the head stage, means for developing an enabling signal on the occurrence of a transition-representative pulse in the head stage of said shift register, and means for applying said enabling signal to the enabling terminals of all of said gates.

4. In combination with apparatus as defined in claim 2, means responsive to the appearance of a transition-representative pulse in the head stage of said shift register for delivering a strobe pulse.

5. Apparatus as defined in claim 4 wherein said strobe pulse-delivering means includes a monovibrator having a trigger input terminal and two output terminals and proportioned to deliver, when triggered by a signal applied to its input terminal, signals of opposite characters at its two output terminals, means for energizing said input terminal by a transition-representative pulse in the head stage of said register, a connection extending from one of said output terminals for carrying said strobe pulse, and a connection extending from the other of said output terminals for controlling the transfer of the contents of said other stages of said shift register.

6. In combination with apparatus as defined in claim 2, a source of clock pulses recurring regularly at the cell rate, and means for advancing the contents of said shift register under control of said clock pulses.

7. In combination with apparatus as defined in claim 6, a first AND gate and a second AND gate, said gates being proportioned to deliver signals of like character when similarly energized, connections for regularly enabling said gates at the cell rate by said clock pulses, means for applying a signal representative of each transition in one sense to one of said gates, and means for applying a like signal representative of each transition in the opposite sense to the other of said gates, whereby said gates deliver like signals in response to all transitions of either sense.

8. In combination with apparatus as defined in claim 7, means for desensitizing each of said gates to spurious pulses which comprises, for each gate, means for delaying the signal representative of a transition by a single cell period and for inverting its polarity, and means for applying to that gate, along with its transition-representative pulse and its clock pulse, said delayed and inverted signal.

9. In combination with apparatus as defined in claim 7, means for desensitizing each of said gates to spurious pulses which comprises, for each gate, means for inverting the polarity of the transition-representative signal to which that gate responds, and means for applying said inverted signal to said gate as a disabling signal after the lapse of a single cell period.

10. A phase modulating system, comprising a source of binary signals each representing a first or a second truth value, a source of clock signals, cyclic counting means stepped periodically over a series of $n$ steps by said clock signals, bistable means alternately set to first and second states by sequentially applied signals of said first truth value, gating means controlled by said counting means for gating a signal from said binary signal source at each of $(n-1)$ states of said counting means, and means for gating a signal of said first truth value to said bistable means in the remaining state of said counting means.

11. The apparatus of claim 10, in which said counting means is selectively adjustable to vary the value of $n$ over a selected range of integers, and means for adjusting said counting means to a selected value of $n$ in said range.

12. A data reproducing system for reproducing binary data embodied in a signal having a series of cells of predetermined duration, said signal including a date transition for each occurrence of a selected truth value in said binary data and a framing transition, at the leading boundary of every $n$th cell of said signal, said system comprising a retriggerable oscillator having a period approximately equal to and not less than said cell duration for producing a series of clock pulses, means controlled by said signal for triggering said oscillator once for each transition in said signal to resynchronize said oscillator at least once for each framing transition, and means controlled by said clock pulses and said signal for producing an output signal pulse for each transition in said signal.

13. The apparatus of claim 12, further comprising counting means responsive to said output pulses for deleting those of said output pulses that correspond to framing transitions.

14. In a phase modulating system, a source of $n$ two-valued signals, a shift register having $n+1$ tandem-connected stages, means for loading each of said signals into one of said stages, means for also loading a framing signal having a preassigned one of said two signal values into the remaining stage of said register, a binary counter proportioned successively to adopt states representative of the successive integers, means responsive to the adoption by said counter of a state representative of the count $n+1$ for passing the contents of said register seriatim to a load, and means for thereupon simultaneously resetting said counter to zero and for clearing said register.

15. In combination with apparatus as defined in claim 14, means for selectively altering the count $n+1$ at which said resetting and clearing operations take place.

16. In combination with apparatus as defined in claim 14, a source of regularly recurrent clock pulses, and means including said clock pulse source and operative each time said register is cleared for advancing the contents of said register from stage to stage thereof.

References Cited

UNITED STATES PATENTS

| | | | |
|---|---|---|---|
| 3,264,623 | 8/1966 | Gabor | 340—174.1 |
| 3,237,176 | 2/1966 | Jenkins | 340—174.1 |

TERRELL W. FEARS, *Primary Examiner.*

A. I. NEUSTADT, *Assistant Examiner.*